(12) United States Patent
Duan et al.

(10) Patent No.: US 10,909,724 B2
(45) Date of Patent: Feb. 2, 2021

(54) METHOD, APPARATUS, AND COMPUTER READABLE MEDIUM FOR ADJUSTING COLOR ANNOTATION OF AN IMAGE

(71) Applicant: Baidu Online Network Technology (Beijing) Co., Ltd, Beijing (CN)

(72) Inventors: Xiong Duan, Beijing (CN); Xianpeng Lang, Beijing (CN); Wang Zhou, Beijing (CN); Miao Yan, Beijing (CN); Yifei Zhan, Beijing (CN); Changjie Ma, Beijing (CN); Yonggang Jin, Beijing (CN)

(73) Assignee: Baidu Online Network Technology (Beijing) Co., Ltd., Bejing (CN)

( * ) Notice: Subject to any disclaimer, the term of this patent is extended or adjusted under 35 U.S.C. 154(b) by 112 days.

(21) Appl. No.: 16/233,863

(22) Filed: Dec. 27, 2018

(65) Prior Publication Data

US 2019/0206088 A1    Jul. 4, 2019

(30) Foreign Application Priority Data

Dec. 29, 2017    (CN) .......................... 2017 1 1486200

(51) Int. Cl.
*G06K 9/46* (2006.01)
*G06K 9/72* (2006.01)
(Continued)

(52) U.S. Cl.
CPC ................ *G06T 7/90* (2017.01); *G06K 9/342* (2013.01); *G06K 9/4652* (2013.01); *G06T 3/40* (2013.01);
(Continued)

(58) Field of Classification Search
CPC ...... G06K 9/342; G06K 9/4652; G06K 9/726; G06T 3/40; G06T 5/30; G06T 7/12;
(Continued)

(56) References Cited

U.S. PATENT DOCUMENTS

| 4,881,067 A | * | 11/1989 | Watanabe | ................ G09G 5/02 345/440 |
| 2006/0239548 A1 | * | 10/2006 | Gallafent | ................ G06T 7/194 382/164 |

(Continued)

FOREIGN PATENT DOCUMENTS

| JP | 2006-31584 A |   | 2/2006 |
| JP | 2007043570 A | * | 2/2007 |

OTHER PUBLICATIONS

Rosin, Paul ("Refining region estimates for post-processing image classification," SPIE vol. 2315, 1994) (Year: 1994).*

(Continued)

*Primary Examiner* — Yubin Hung
(74) *Attorney, Agent, or Firm* — Seed IP Law Group LLP

(57) ABSTRACT

Embodiments of the present disclosure provide a method, apparatus, and computer readable storage medium for processing an image. The method described herein includes determining a to-be-processed first region and a to-be-processed second region in an input image, the first region is at least partially filled with a first color, the second region is at least partially filled with a second color, and the first region and the second region are adjacent regions sharing a common boundary region. The method further includes shrinking the first region and the second region, to enable neither of the shrunken first region and the shrunken second region to include the boundary region. The method further comprises expanding the shrunken first region and the shrunken second region, to enable the boundary region to be filled with at least one color of the first color or the second color.

15 Claims, 9 Drawing Sheets

(51) Int. Cl.
  *G06T 5/30* (2006.01)
  *G06T 7/90* (2017.01)
  *G06T 7/149* (2017.01)
  *H04N 1/393* (2006.01)
  *G06T 7/12* (2017.01)
  *G06K 9/34* (2006.01)
  *G06T 3/40* (2006.01)
  *G06T 11/00* (2006.01)

(52) U.S. Cl.
  CPC .............. *G06T 5/30* (2013.01); *G06T 7/12* (2017.01); *G06T 7/149* (2017.01); *G06T 11/001* (2013.01); *H04N 1/393* (2013.01); *H04N 1/3935* (2013.01); *G06K 9/726* (2013.01); *G06T 2207/10024* (2013.01); *G06T 2207/20021* (2013.01); *G06T 2207/20081* (2013.01); *G06T 2207/20192* (2013.01); *G06T 2207/30252* (2013.01)

(58) Field of Classification Search
  CPC ......... G06T 7/149; G06T 7/90; G06T 11/001; G06T 2207/10024; G06T 2207/20021; G06T 2207/20192; G06T 2207/20081; G06T 2207/30252; H04N 1/393; H04N 1/3935
  See application file for complete search history.

(56) References Cited

U.S. PATENT DOCUMENTS

| | | | | |
|---|---|---|---|---|
| 2009/0303505 | A1* | 12/2009 | Yago | H04N 1/403 358/1.9 |
| 2009/0316970 | A1* | 12/2009 | Kemper | G06T 7/0012 382/131 |
| 2010/0172576 | A1* | 7/2010 | Goldfarb | G06T 7/11 382/164 |
| 2011/0038011 | A1* | 2/2011 | Kimura | G06K 15/02 358/3.24 |
| 2011/0243373 | A1* | 10/2011 | Li | G06T 11/60 382/100 |
| 2015/0106755 | A1* | 4/2015 | Moore | G06F 40/166 715/765 |
| 2016/0300343 | A1* | 10/2016 | Gazit | G16H 50/50 |
| 2017/0274285 | A1 | 9/2017 | Aguilar | |
| 2017/0339408 | A1* | 11/2017 | Kang | G06T 5/20 |

OTHER PUBLICATIONS

Delon et al., "Automatic Color Palette", *IEEE*, 2005, 4 pages.
Rosin, P., "Refining Region Estimates", *International Journal of Pattern Recognition and Artificial Intelligence*, vol. 12(6): 841-866, 1998.
Delon et al., Automatic Color Palette, *Inverse Problems and Imaging*, vol. 1, No. 2, 2007, pp. 265-287.
Christoudias et al., "Synergism in Low Level Vision", 6 pages.
Mould, "A Stained Glass Image Filter", Eurographics Symposium on Rendering 2003, 7 pages.
Laganière, "Morphological corner Detection," Sixth International Conference on Computer Vision (IEEE Cat. No. 98CH36271), Bombay, India, 1998, pp. 280-285, doi: 10.1109/ICCV.1998.710731.

* cited by examiner

METHOD, APPARATUS, AND COMPUTER READABLE MEDIUM FOR ADJUSTING COLOR ANNOTATION OF AN IMAGE

CROSS-REFERENCE TO RELATED APPLICATIONS

This application claims priority to Chinese Patent Application No. 201711486200.2, filed with the China National Intellectual Property Administration (CNIPA) on Dec. 29, 2017, the content of which is incorporated herein by reference in its entirety.

TECHNICAL FIELD

Embodiments of the present disclosure mainly relate to the field of computer vision, and more specifically to a method, apparatus, and computer readable medium for processing an image.

BACKGROUND

As a basic technology for image understanding, the semantic segmentation of an image generally refers to grouping the pixels in the image according to the expressed semantic meaning, to recognize the contents in the image. Early semantic segmentation solution of an image usually performs image segmentation based on the low-order visual information of pixels in the image, and the segmentation precision thereof is often unsatisfactory. After the computer vision enters the deep learning era, the semantic segmentation technology of an image based on deep learning is widely used.

The segmentation effect of the semantic segmentation technology of an image based on deep learning has advanced leaps and bounds as compared to the early solutions, but it has high requirements on data annotation. The semantic segmentation technology of an image based on deep learning not only needs to use a large number of images as model training data, but also requires pixel-level annotation on different objects existing in the images. Usually, different objects in the image can be annotated in different colors. However, if the boundary of the annotated color blocks is not smooth enough or if an object is annotated in an improper color, then the trained semantic segmentation model may fail to produce desired semantic segmentation results.

SUMMARY

An illustrative embodiment according to the present disclosure provides a solution for processing an image.

A first aspect of the present disclosure provides a method for processing an image. The method includes determining a to-be-processed first region and a to-be-processed second region in an input image. The first region is at least partially filled with a first color, the second region is at least partially filled with a second color, and the first region and the second region are adjacent regions sharing a common boundary region. The method further includes shrinking the first region and the second region, to enable neither of the shrunken first region and the shrunken second region to include the boundary region. The method further includes expanding the shrunken first region and the shrunken second region, to enable the boundary region to be filled with at least one color of the first color or the second color.

A second aspect of the present disclosure provides an apparatus for processing an image. The apparatus includes: an region determining module configured for determining a to-be-processed first region and a to-be-processed second region in an input image, the first region at least partially filled with a first color, the second region at least partially filled with a second color, the first region and the second region being adjacent regions sharing a common boundary region; a first image processing module configured for shrinking the first region and the second region, to enable neither of the shrunken first region and the shrunken second region to include the boundary region; and a second image processing module configured for expanding the shrunken first region and the shrunken second region, to enable the boundary region to be filled with at least one color of the first color or the second color.

A third aspect of the present disclosure provides an electronic device, including one or more processors, and a memory. The memory is used for storing one or more programs. The one or more programs enable, when executed by the one or more processors, the one or more processors to implement the method according to the first aspect of the present disclosure.

A sixth aspect of the present disclosure provides a device, including one or more processors; and a memory for storing one or more programs. The one or more programs enable, when executed by the one or more processors, the one or more processors to implement the method according to the second aspect of the present disclosure.

A fourth aspect of the present disclosure provides a computer readable medium storing a computer program therein. The program implements, when executed by a processor, the method according to the first aspect of the present disclosure.

It should be understood that the content described in the SUMMARY part is neither intended to limit key or important characteristics of the embodiment of the present disclosure, nor used for limiting the scope of the present disclosure. Other characteristics of the present disclosure will become readily understood based on the following description.

BRIEF DESCRIPTION OF THE DRAWINGS

The above and other characteristics, advantages, and aspects of the embodiments of the present disclosure will become more apparent by referring to following detailed description in conjunction with the accompanying drawings. Identical or like reference numerals in the drawings represent identical or similar elements.

DETAILED DESCRIPTION OF EMBODIMENTS

Figure 1:
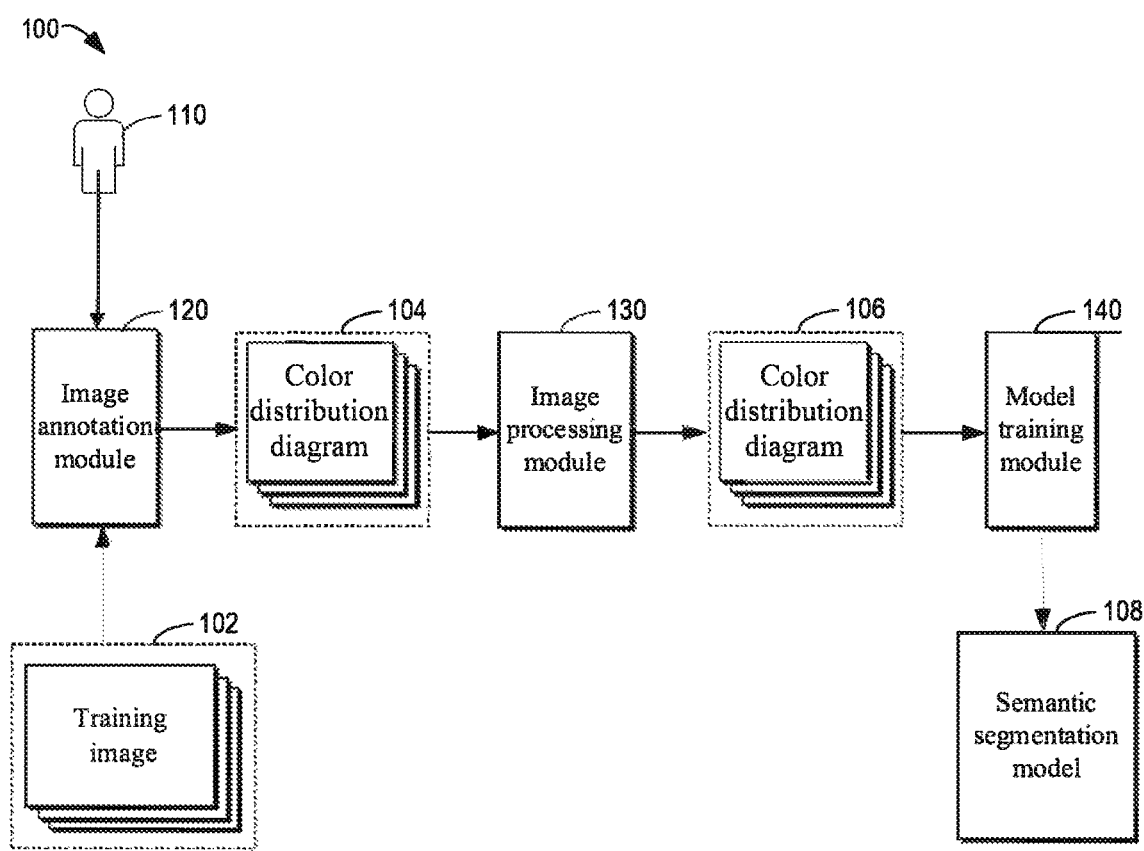
FIG. 1 shows a schematic diagram of an exemplary environment in which embodiments of the present disclosure can be implemented.

Embodiments of the present disclosure will be described in more detail hereinafter by referring to the accompanying drawings. While some embodiments of the present disclosure are shown in the drawings, it should be understood that the present disclosure may be implemented in various forms, and should not be construed as limited to the embodiments set forth herein. Rather, these embodiments are provided to more thoroughly and completely understand the present disclosure. It should be understood that the drawings and embodiments of the present disclosure are only used as examples, rather than limiting the scope of protection of the present disclosure.

In the description on embodiments of the present disclosure, the term "include" and wordings similar to the term should be understood as open-ended inclusion, i.e., "including but not limited to." The term "based on" should be understood as "at least partially based on." The term "one embodiment" or "the embodiment" should be understood as "at least one embodiment." The terms, such as "first," and "second," may refer to different or identical objects. Other explicit and implicit definitions may also be included hereinafter.

As mentioned above, the conventional semantic segmentation technology of an image based on deep learning not only needs to use a large number of images as model training data, but also requires pixel-level annotation on different objects existing in the images. Such annotation can be manually completed with the help of annotation tools. Usually, the above annotations are accomplished by filling image regions representing different objects with different colors. As used herein, the image region filled with a color is also known as a "color block." The manually annotated image can be provided to the semantic segmentation model training system for training the semantic segmentation model. As used herein, the term "model" may learn an association between corresponding inputs and outputs from the training data, to generate a corresponding output for a given input after completing training. For example, the trained semantic segmentation model can be used for generating a semantic segmentation result for a to-be-identified image, i.e., identifying various objects included in the image.

However, errors may occur when manually annotating a training image. For example, an object may be annotated in an improper color. In this case, the trained semantic segmentation model may produce improper semantic segmentation results, such as failing to correctly identify the object included in the image. In addition, a boundary of a manually filled color block may not be smooth enough. For example, the color block may have a jagged boundary, and boundaries of adjacent color blocks may have insufficiently filled fuzzy regions, and so on. In this case, the trained semantic segmentation model may fail to achieve satisfactory segmentation precision.

An embodiment of the present disclosure provides a solution for processing an image. The solution establishes a color dictionary for valid color blocks in an annotated training image, and assigns different priority levels to different color blocks. The solution removes jagged or fuzzy boundaries of color blocks, and then expands and superimposes the color blocks based on the different priority levels of the different color blocks, thereby obtaining a training image having a smooth color block boundary. In addition, the solution can also automatically correct errors in image annotation.

By automatically correcting errors in the image annotation and smoothing color block boundaries in the annotated training image, the solution can provide a precisely annotated training image for a subsequent semantic segmentation model training system, thereby improving the precision in subsequent image segmentation. Therefore, the solution can be widely used in semantic segmentation applications, including but not limited to an autonomous driving system (such as streetscape recognition and understanding), an autonomous vehicle application (such as landing point determination), a wearable device application, and the like.

Embodiments of the present disclosure will be specifically described hereinafter by referring to the accompanying drawings.

FIG. 1 shows a schematic diagram of an exemplary environment 100 in which embodiments of the present disclosure can be implemented. The environment 100 generally may include an image annotation module 120, an image processing module 130, and a model training module 140. It should be understood that, a structure and a function of the environment 100 are described merely for exemplary purposes, without implying any limitation on the scope of the present disclosure. Implementations of the present disclosure may also be applied to environments having different structures and/or functions.

Figure 2:
FIG. 2 shows an example of a training image according to an embodiment of the present disclosure.

The image annotation module 120 may be operated by a user 110 to annotate a training image 102. The training image 102 may include a plurality of to-be-segmented objects. For example, FIG. 2 shows an example of the training image 102 according to an embodiment of the present disclosure. As shown in FIG. 2, the exemplary training image 102 may include sky 201, trees 202 (including trees on left and right sides of a road), the road 203, a vehicle 204, a fence 205 on both sides of the road, and the like. For illustrative purposes and for simplification, FIG. 2 only identifies some objects in the training image 102, instead of all objects.

Figure 3:
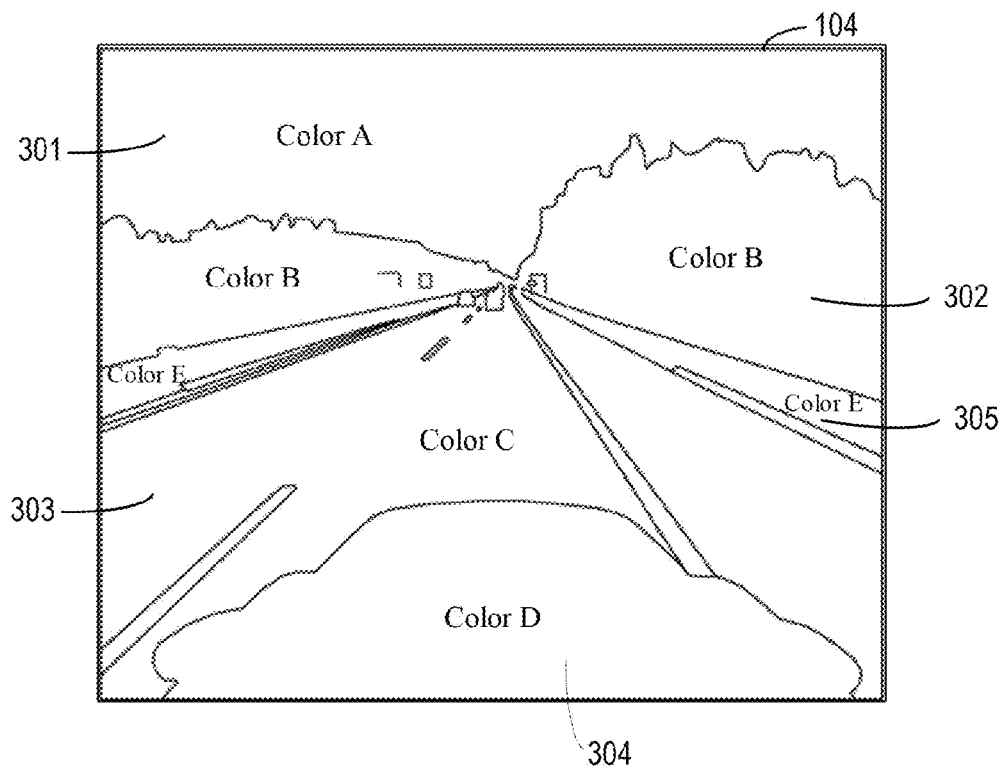
FIG. 3 shows an example of an annotated color distribution diagram according to an embodiment of the present disclosure.

The user 110 can annotate different objects in the training image 102 through the image annotation module 120 using different colors. Specifically, the user 110 can fill regions corresponding to different objects using predefined different colors, to generate a color distribution diagram 104 corresponding to the training image 102. For example, FIG. 3 shows an example of the color distribution diagram 104 corresponding to the training image 102 as shown in FIG. 2. In FIG. 3, for example, an region 301 corresponding to the sky 201 in the training image 102 is filled with a color A, an region 302 corresponding to trees 202 in the training image 102 is filled with a color B, an region 303 corresponding to a road 203 in the training image 102 is filled with a color C, an region 304 corresponding to a vehicle 204 in the training image 102 is filled with a color D, and an region 305 corresponding to a fence 205 in the training image 102 is filled with a color E. It should be understood that the colors A to E herein may be any pre-defined color.

As mentioned above, a number of problems may exist in the color distribution diagram 104 annotated by the user 110. In some cases, the user 110 may annotate a certain object in an improper color (for example, assuming that the fence should be annotated in pink, but the operator 110 annotates it in unspecified dark red). In addition, in some cases, a boundary of a color block filled by the user 110 may not be smooth enough. For example, the color block may have a jagged boundary, and boundaries of adjacent color blocks may have insufficiently filled fuzzy regions, and so on. The image processing module 130 can correct the problems that may occur in the color distribution diagram 104.

In some embodiments, the image processing module 130 may acquire a color dictionary for the color distribution diagram 104. The color dictionary may be stored in any appropriate form, such as a database table or a file, and indicates a plurality of valid colors in the color distribution diagram 104. For example, for the color distribution diagram 104 as shown in FIG. 3, the color dictionary may indicate the color A, the color B, the color C, the color D, and the color E being valid colors. Based on the color dictionary, the image processing module 130 may correct a color block that is not filled with a valid color in the color distribution diagram 104 as being filled with a best matching valid color. In this way, errors occurring in manual annotation can be eliminated.

Furthermore, in some embodiments, the color dictionary may also indicate different valid colors having different priority levels. Specifically, different priority levels may be assigned to different valid colors according to a semantic relationship between different color blocks in a realistic environment. For example, the priority level of a foreground may be higher than the priority level of a background. As an example of the color distribution diagram 104 shown in FIG. 3, the region 301 filled with the color A corresponds to the sky 201 as shown in FIG. 2, and the region 302 filled with the color B corresponds to the trees 202 as shown in FIG. 2. Since the sky 201 is the background of the trees 202, the color A filled in the region 301 may have a lower priority level, relative to the color B filled in the region 302. Similarly, the region 303 filled with the color C corresponds to the road 203 as shown in FIG. 2, and the region 304 filled with the color D corresponds to the vehicle 204 as shown in FIG. 2. Since the sky 203 is the background of the vehicle 204, the color C filled in the region 303 may have a lower priority level, relative to the color D filled in the region 304. It should be understood that corresponding priority levels may be assigned to different valid colors using other rule, and the scope of the present disclosure is not limited in this respect.

Based on the color dictionary, the image processing module 130 can determine adjacent valid color blocks in the color distribution diagram 104 (i.e., both of the adjacent color blocks filled with valid colors). The image processing module 130 can first remove a boundary region between the adjacent valid color blocks (for example, the boundary region may be jagged or fuzzy). Then, the image processing module 130 can execute image dilation and superposition on the adjacent valid color blocks based on different priority levels of the adjacent valid color blocks, to fill the boundary region with the valid color. In this way, a jagged or fuzzy boundary region that may exist between the adjacent color blocks can be smoothed.

The image processing module 130 can generate a corrected color distribution diagram 106 by correcting the problems existing in the color distribution diagram 104. The corrected color distribution diagram 106 can be provided to the model training module 140 for generating a semantic segmentation model 108. The trained semantic segmentation model 108 can be used for generating a semantic segmentation result for a to-be-identified image, i.e., identifying objects included in the image. Working principle of the image processing module 130 will be further described in conjunction with FIG. 4.

Figure 4:
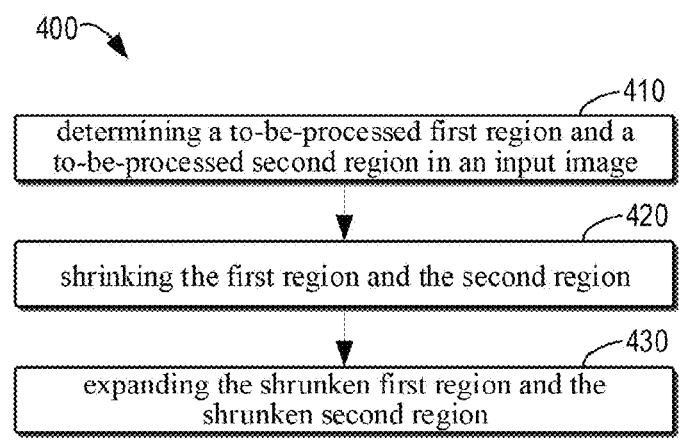
FIG. 4 shows a flow chart of a method for smoothing a boundary of adjacent color blocks according to an embodiment of the present disclosure.

FIG. 4 shows a flow chart of a method 400 for processing an image according to an embodiment of the present disclosure. For example, the method 400 may be executed by the image processing module 130 as shown in FIG. 1. It should be understood that the method 400 may further include additional steps (not shown) and/or may omit the shown steps. The scope of the present disclosure is not limited in this respect.

In box 410, the image processing module 130 determines a to-be-processed first region and a to-be-processed second region in the color distribution diagram 104. Herein, the color distribution diagram 104 is also referred to as an "input image" of the image processing module 130. The first region and the second region may be adjacent regions sharing a common boundary region. Furthermore, the first region may be at least partially filled with a first color, and the second region may be at least partially filled with a second region.

In some embodiments, the image processing module 130 can acquire a color dictionary, to determine the to-be-processed first region and the to-be-processed second region. For example, the color dictionary can indicate a plurality of valid colors filled in regions in the input image. In some embodiments, the color dictionary may be predefined. In some other embodiments, when no improper color exists in the color distribution diagram 104, the image processing module 130 can also automatically obtain the color dictionary by learning color distribution in the color distribution diagram 104. The image processing module 130 can use mutually adjacent two regions filled with valid colors as the to-be-processed first region and the to-be-processed second region based on the obtained color dictionary.

Taking the color distribution diagram 104 in FIG. 3 as an example, the image processing module 130 may acquire a color dictionary for the color distribution diagram 104. For example, the color dictionary may indicate the color A, the color B, the color C, the color D, and the color E being valid colors. The image processing module 130 can determine the mutually adjacent regions 301 and 302 respectively as the to-be-processed first region and the to-be-processed second region. Alternatively, the image processing module 130 can determine the mutually adjacent regions 302 and 305 respectively as the to-be-processed first region and the to-be-processed second region. Alternatively, the image processing module 130 can determine the mutually adjacent regions 303 and 304 respectively as the to-be-processed first region and the to-be-processed second region.

In box 420, the image processing module 130 shrinks the first region and the second region, to enable neither of the shrunken first region and the shrunken second region to include the boundary region. In some examples, a boundary region between the first region and the second region may have another color different from the first color and the second color. For example, the boundary region may be a fuzzy region at a junction region of two color blocks.

Furthermore, due to manual annotation, a boundary between the first region and the second region may not be clear or smooth enough.

In some embodiments, the image processing module 130 can directly remove the boundary region from the first region and the second region. For example, the image processing module 130 can fill the boundary region with a predefined invalid color, such as black. That is, through the operation, the first region and the second region may be separated by a region filled with an invalid color.

Alternatively or additionally, in some embodiments, the image processing module 130 can execute image erosion respectively on the first region and the second region, to remove a plurality of pixels near the boundary of the first region and the second region. In this way, neither of the eroded first region and the eroded second region include the jagged or fuzzy boundary region.

Figure 5:
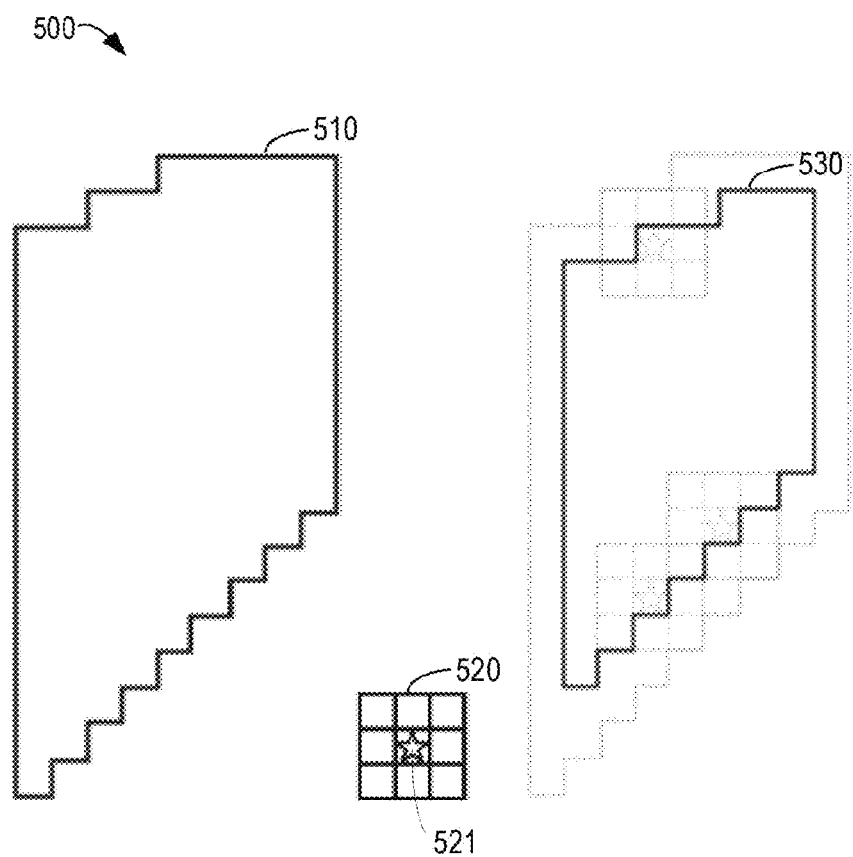
FIG. 5 shows a schematic diagram of image erosion according to an embodiment of the present disclosure.

FIG. 5 shows a schematic diagram of image erosion according to an embodiment of the present disclosure. FIG. 5 shows a to-be-eroded input image 510 and a structuring element 520 for image erosion on the image 510. The image 510 may be, for example, the first region or the second region as mentioned above, which is filled with a specific valid color. In FIG. 5, the structuring element 520 is a small image including 3×3 pixels, the origin 521 is denoted by a symbol of a five-pointed star. The origin 521 serves as a reference point in subsequent erosion operation.

In some embodiments, the structuring element for image erosion on the image 510 may be determined based on an erosion coefficient. The erosion coefficient may denote a to-be-corroded degree of the image 510. For example, when the erosion coefficient is 3, the structuring element including the 3×3 pixels as shown in FIG. 5 may be used. When the erosion coefficient is 2, a structuring element including 2×2 pixels may be used. In some embodiments, the image processing module 130 may use different erosion coefficients respectively for a to-be-corroded first region and a to-be-corroded second region. That is, the image processing module 130 can perform image erosion on the first region and the second region respectively using different structuring elements. Alternatively, in some embodiments, the image processing module 130 may use identical erosion coefficients for the to-be-corroded first region and the to-be-corroded second region. That is, the image processing module 130 can perform image erosion on the first region and the second region respectively using identical structuring elements.

Furthermore, while the structuring element 520 shown in FIG. 5 is a square, and the origin 521 is exactly at the center point, it should be understood that this is merely for illustrative purposes, and is not intended to limit the scope of the present disclosure. In some embodiments, the image processing module 130 may use a structuring element of other shape, and a location of the origin of the structuring element may be any location.

For performing image erosion on the image 510, the image processing module 130 may first seek a part completely matching the structuring element 520 in the image 510. When such a part is found, the image processing module 130 may fill a pixel corresponding to the origin 521 and in a blank output image (e.g., a completely black image, also referred to as a "vacuum image") with a valid color filled in a source image 510. The image processing module 130 may repeatedly execute the process, until the processing on all parts matching the structuring element 520 and existing in the image 510 are completed. The generated output image is as shown by the image 530 in FIG. 5.

It should be understood that a binary (i.e., a pixel in the output image 530 has one of an invalid color or a valid color) image erosion method shown in FIG. 5 is only an exemplary implementation of image erosion operation. In some embodiments, the first region and the second region can also be processed using a currently available or is to be developed image erosion method that is different from FIG. 5. The scope of the present disclosure is not limited in this respect.

Figure 6:
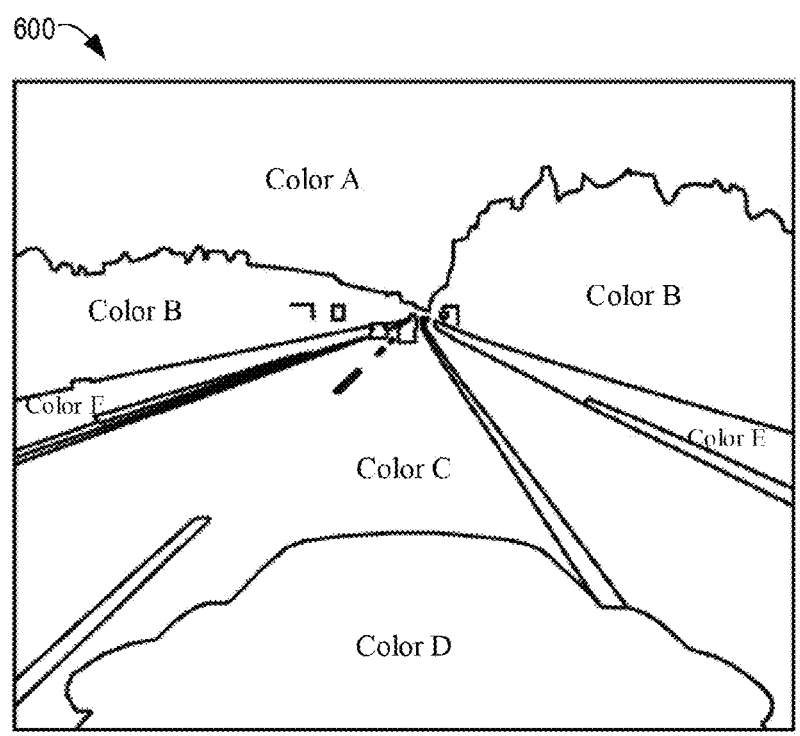
FIG. 6 shows an example of a eroded color distribution diagram according to an embodiment of the present disclosure.

FIG. 6 shows a color distribution diagram 600 generated by an image erosion operation on the image distribution diagram 104 shown in FIG. 3. As shown in FIG. 600, a boundary region between adjacent regions is removed by executing image erosion shown in FIG. 5 on the adjacent regions. For example, the boundary region is filled with a predefined invalid color (such as black), to enable the adjacent regions to be separated by a region filled with an invalid color.

By referring back to FIG. 4, in box 430, the image processing module 130 expands the shrunken first region and the shrunken second region, to enable the boundary region to be filled with at least one color of the first color or the second color. In some embodiments, in order to expand the first region and the second region, the image processing module 130 can expand and superpose the first region and the second region based on different priority levels of different regions indicated by a color dictionary.

In some embodiments, the image processing module 130 can execute image dilation on the shrunken first region, to add a plurality of pixels having the first color near the first boundary of the shrunken first region. Additionally, the image processing module 130 can further execute image dilation on the shrunken second region, to add a plurality of pixels having the second color near the second boundary of the shrunken second region.

Figure 7:
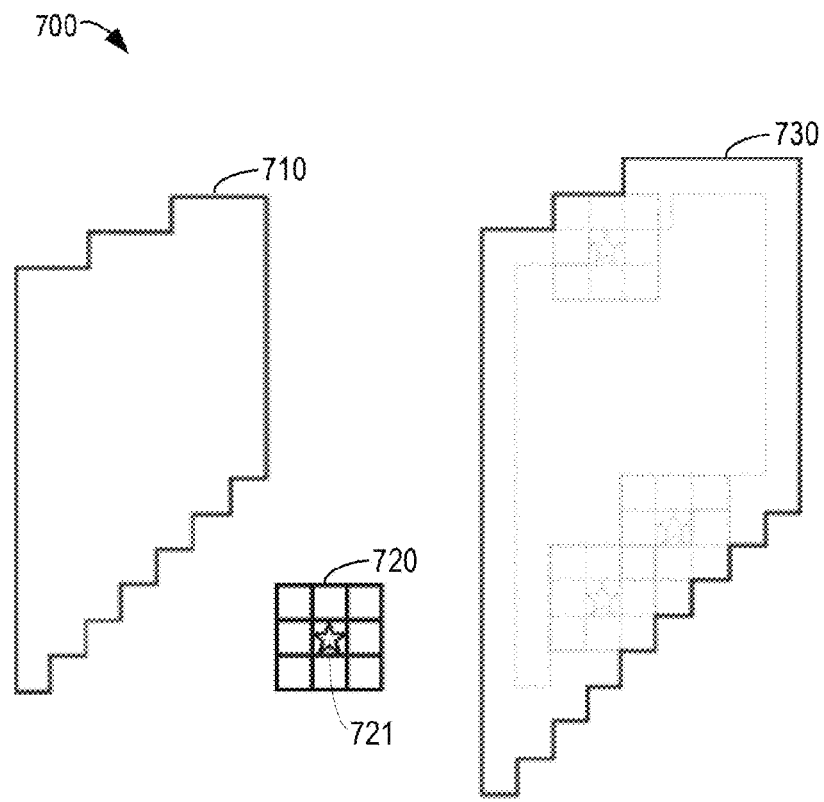
FIG. 7 shows a schematic diagram of image dilation according to an embodiment of the present disclosure.

FIG. 7 shows a schematic diagram of image dilation according to an embodiment of the present disclosure. FIG. 7 shows a to-be-expanded input image 710 and a structuring element 720 for image dilation on the image 710. The image 710 may be, for example, the first to-be-expanded region or the second to-be-expanded region as mentioned above, which is filled with a specific valid color. In FIG. 7, the structuring element 720 is a small image including 3×3 pixels, the origin 721 thereof is denoted by a symbol of a five-pointed star. The origin 721 serves as a reference point in subsequent image dilation operation.

In some embodiments, the structuring element for image dilation on the image 710 may be determined based on an expansion coefficient. The expansion coefficient may denote a to-be-expanded degree of the image 710. For example, when the expansion coefficient is 3, the structuring element including the 3×3 pixels as shown in FIG. 7 may be used. When the expansion coefficient is 2, a structuring element including 2×2 pixels may be used. In some embodiments, the image processing module 130 may use different expansion coefficients respectively for the first region and the second region. That is, the image processing module 130 can perform image dilation on the first region and the second region respectively using different structuring elements. Alternatively, in some embodiments, the image processing module 130 may use identical expansion coefficients for the first region and the second region. That is, the image processing module 130 can perform image dilation on the first region and the second region respectively using identical structuring elements. Additionally or alternatively, the expansion coefficient for a specific region may be identical to or different from the foregoing expansion coefficient for the region.

Furthermore, while the structuring element 720 shown in FIG. 7 is a square, and the origin 721 is exactly at the center point, it should be understood that this is merely for illustrative purposes, and is not intended to limit the scope of the present disclosure. In some embodiments, the image processing module 130 may use a structuring element of other shape, and a location of the origin of the structuring element may be any location.

In order to perform image dilation on the image 710, the image processing module 130 may enable the origin 721 of the structuring element 720 to successively pass through each pixel in the image 710. When the origin 721 passes through a pixel in the image 710, the image processing module 130 may fill all pixels (e.g., 9 pixels) corresponding to the structuring element 720 of a blank output image (e.g., a completely black image, also referred to as a "vacuum image") with a valid color filled in a source image 610. The image processing module 130 can repeatedly execute the process until the origin 721 traverses pixels in the image 710. The generated output image is as shown by the image 730 in FIG. 7.

It should be understood that a binary (i.e., a pixel in the output image 730 has one of an invalid color or a valid color) image dilation shown in FIG. 7 is only an exemplary implementation of image dilation operation. In some embodiments, the shrunken first region and the shrunken second region can also be processed using a currently available or to be developed image erosion method that is different from FIG. 7. The scope of the present disclosure is not limited in this respect.

Furthermore, the image processing module 130 can perform image superposition on the first region and the second region obtained after the image dilation. In some embodiments, the color dictionary may indicate different color blocks (or different colors filled in different color blocks) having different priority levels. For example, the color dictionary can indicate that the first region filled with a first color has a first priority level, while the second region filled with a second color has a second priority level. In some embodiments, the image processing module 130 can perform image superposition on the expanded first region and the expanded second region based on different priority levels of different valid colors indicated by the color dictionary. Specifically, the expanded first region and the expanded second region may have a superposed region. When the first priority level of the first region is higher than the second priority level of the second region, the first region will cover the second region at the superposed region. That is, the superposed region will be filled with the first color. When the second priority level of the second region is higher than the first priority level of the first region, the second region will cover the first region at the superposed region. That is, the superposed region will be filled with the second color. As mentioned hereinabove, the priority levels of different color blocks can often be assigned according to a semantic relationship between the different color blocks in a realistic environment. For example, the priority level of a foreground may be higher than the priority level of a background. In this way, by image dilation and image superposition on shrunken adjacent regions, a region having a higher priority level in the adjacent regions will at least partially cover a region having a lower priority level.

Figure 8:
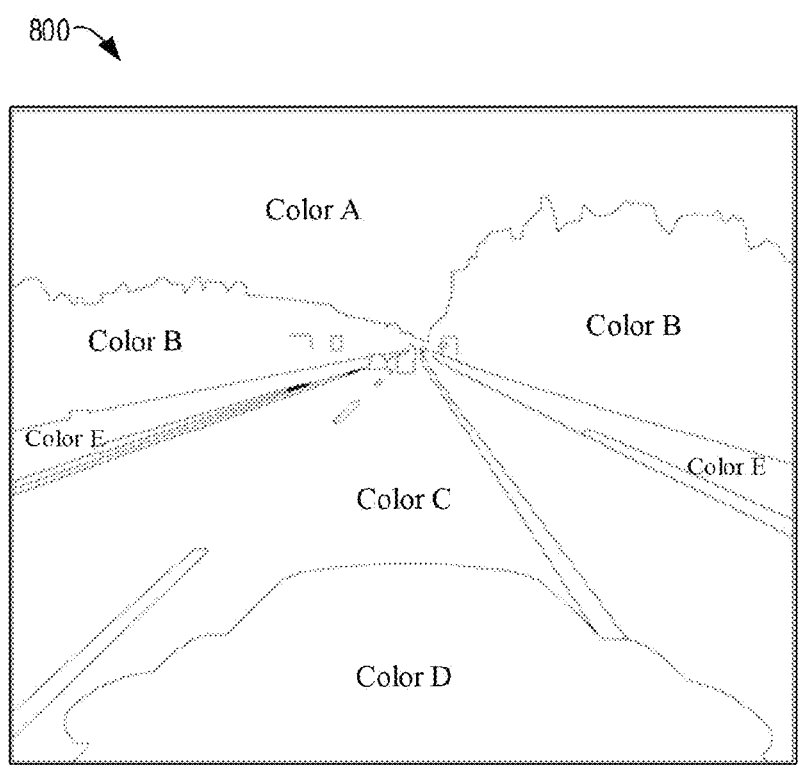
FIG. 8 shows an example of an expanded color distribution diagram according to an embodiment of the present disclosure.

FIG. 8 shows a color distribution diagram 800 generated by an image dilation operation on the image distribution diagram 600 shown in FIG. 6. As shown in the diagram 800, by executing image dilation shown in FIG. 7 on the adjacent regions, a black region (i.e., deleted boundary region) between the adjacent regions shown in FIG. 6 is filled with valid colors filled in the adjacent regions. In this way, a training image having a smooth color block boundary can be obtained, for being used by the model training module 140 as shown in FIG. 1.

The corresponding operations executed by the image processing module 130 to smooth the boundary between adjacent color blocks in the training image are described hereinabove. Additionally or alternatively, the image processing module 130 can further correct improperly annotated color blocks that may exist in the color distribution diagram 104.

Figure 9:
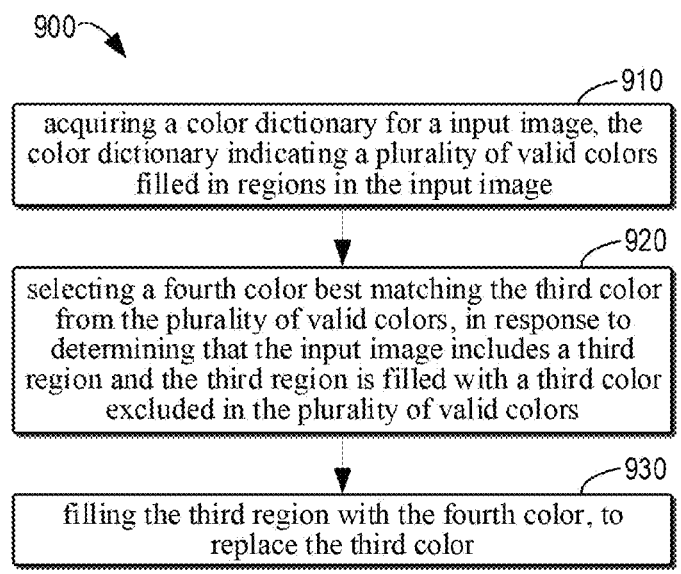
FIG. 9 shows a flow chart of a method for correcting an improper color according to an embodiment of the present disclosure.

FIG. 9 shows a flow chart of a method 900 for correcting an improper color according to an embodiment of the present disclosure. For example, the method 900 may be executed by the image processing module 130 as shown in FIG. 1. It should be understood that the method 900 may further include additional steps (not shown) and/or may omit the shown steps. The scope of the subject matter described herein is not limited in this respect.

In box 910, the image processing module 130 obtains a color dictionary for the input image (i.e., a color distribution diagram 104). The color dictionary indicates a plurality of valid colors filled in regions of the input image. Taking the color distribution diagram 104 as shown in FIG. 3 as an example, the color dictionary may indicate the color A, the color B, the color C, the color D, and the color E being valid colors.

In box 920, in response to determining that the input image includes a third region and the third region is filled with a third color excluded in the plurality of valid colors, the image processing module 130 selects a fourth color best matching the third color from the plurality of valid colors. For example, the image processing module 130 can check color blocks in the input image, to determine if there is the third region that is filled with the third color excluded in the plurality of valid colors.

In some embodiments, when determining that there is the third region that is filled with the third color excluded in the plurality of valid colors, the image processing module 130 can determine distances between the third color and the plurality of valid colors. The distances can indicate corresponding differences between the third color and the plurality of valid colors.

For example, taking a red-green-blue (RGB) color space as an example, one color may be represented by a combination of values of the three color-channels (R value, G value, B value), and may correspond to a vector in a three-dimensional coordinate system. Assuming that the third color is represented by a first vector, and one of the plurality of valid colors is represented by a second vector, then the image processing module 130 can calculate a Euclidean distance between the first vector and the second vector for use as the distance between the third color and the valid color. In this way, the image processing module 130 can determine the distances between the third color and the plurality of valid colors. How to determine a distance between two colors in the RGB color space is described hereinabove taking the RGB color space as an example. It should be understood that this is merely for illustrative purposes, and is not intended to limit the scope of the present disclosure in any way. The embodiment of the present disclosure also applies to other color spaces, such as a YUV color space. Moreover, the difference between the two colors can be determined using any method that is currently available or is to be developed in the future, and the scope of the present disclosure is not limited in this respect.

Furthermore, the image processing module 130 can select a valid color having a smallest distance between the valid color and the third color from the plurality of valid colors, for use as the fourth color.

In box 930, the image processing module 130 can fill the third region with the fourth color, to replace the third color. In this way, improper colors occurring in manual annotation can be automatically corrected.

In some embodiments, the method 900 may be executed before the method 400. That is, the image processing module 130 first corrects improper colors in the color distribution diagram 104, and then smooths boundaries of adjacent color blocks therein. In some other embodiments, the method 900 may also be executed after the method 400 or be executed in parallel with the method 400. Furthermore, in some embodiments, the method 900 and the method 400 may be executed independently from each other. For example, for different situations, the image processing module 130 can only execute the method 400 or the method 900. The scope of the present disclosure is not limited in this respect.

As can be seen from the above description, the embodiment of the present disclosure can remove jagged or fuzzy boundaries between adjacent color blocks in a manually annotated training image, and expand and superimpose the color blocks based on the different priority levels of the different color blocks, thereby obtaining a training image having a smooth color block boundary. Furthermore, the embodiment of the present disclosure can also automatically correct errors in image annotation. By automatically correcting errors in the image annotation and smoothing color block boundaries in the annotated training image, the embodiment of the present disclosure can provide a precisely annotated training image for a subsequent semantic segmentation model training system, thereby improving the precision in subsequent image segmentation. Therefore, the embodiment of the present disclosure can be widely used in semantic segmentation applications, including but not limited to an autonomous driving system (such as streetscape recognition and understanding), an autonomous vehicle application (such as landing point determination), a wearable device application, and the like.

Figure 10:
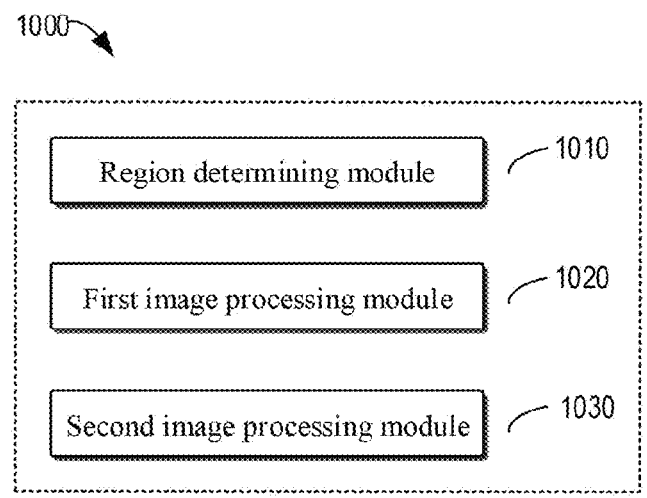
FIG. 10 shows a schematic block diagram of an apparatus for processing an image according to an embodiment of the present disclosure.

FIG. 10 shows a schematic block diagram of an apparatus 1000 for processing an image according to an embodiment of the present disclosure. As shown in FIG. 10, the apparatus 1000 may include a region determining module 1010 configured for determining a to-be-processed first region and a to-be-processed second region in an input image. The first region is at least partially filled with a first color, the second region is at least partially filled with a second color, and the first region and the second region are adjacent regions sharing a common boundary region. The apparatus 1000 may further include a first image processing module 1020 configured for shrinking the first region and the second region, to enable neither of the shrunken first region and the shrunken second region to include the boundary region. Furthermore, the apparatus 1000 may further include a second image processing module 1030 configured for expanding the shrunken first region and the shrunken second region, to enable the boundary region to be filled with at least one color of the first color or the second color.

In some embodiments, the region determining module 1010 further includes: a color dictionary acquisition unit configured for acquiring a color dictionary, the color dictionary indicating a plurality of valid colors filling in regions in the input image; and a region determining unit configured for determining the first region and the second region adjacent to each other, in response to determining the first color and the second color are included in the plurality of valid colors.

In some embodiments, the image processing module 1020 is further configured for: removing the boundary region from the first region and the second region.

In some embodiments, the image processing module 1020 further includes: a first image erosion unit configured for executing image erosion on the first region, to remove a plurality of pixels near a first boundary of the first region in the first region; and a second image erosion unit configured for executing image erosion on the second region, to remove a plurality of pixels near a second boundary of the second region in the second region.

In some embodiments, the color dictionary further indicates the first color being associated with a first priority level, and the second color being associated with a second priority level. The second image processing module 1030 further includes: a first image dilation unit configured for executing image dilation on the shrunken first region, to add a plurality of pixels having the first color near the first boundary of the shrunken first region; a second image dilation unit configured for executing image dilation on the shrunken second region, to add a plurality of pixels having the second color near the second boundary of the shrunken second region; and an image superposition unit configured for executing image superposition on the first region and the second region obtained after the image dilation based on the first priority level and the second priority level.

In some embodiments, the image superposition unit is further configured for: enabling the first region obtained after the image dilation to at least partially cover the second region obtained after the image dilation, in response to the first priority level being higher than the second priority level.

In some embodiments, the input image includes a third region. The third region is filled with a third color excluded in the plurality of valid colors. The apparatus 1000 further includes: a color selection module configured for selecting a fourth color best matching the third color from the plurality of valid colors; and a color replacement module configured for filling the third region with the fourth color to replace the third color.

In some embodiments, the color selection module includes: a distance determining unit configured for determining respective distances between the third color and the plurality of valid colors, the distances indicating corresponding differences between the third color and the plurality of valid colors; and a color selection unit configured for selecting a valid color having a smallest distance between the valid color and the third color from the plurality of valid colors as the fourth color.

In some embodiments, the third color is represented by a first vector, the fourth color is represented by a second vector, and the distance between the third color and the fourth color is a Euclidean distance between the first vector and the second vector.

Figure 11:
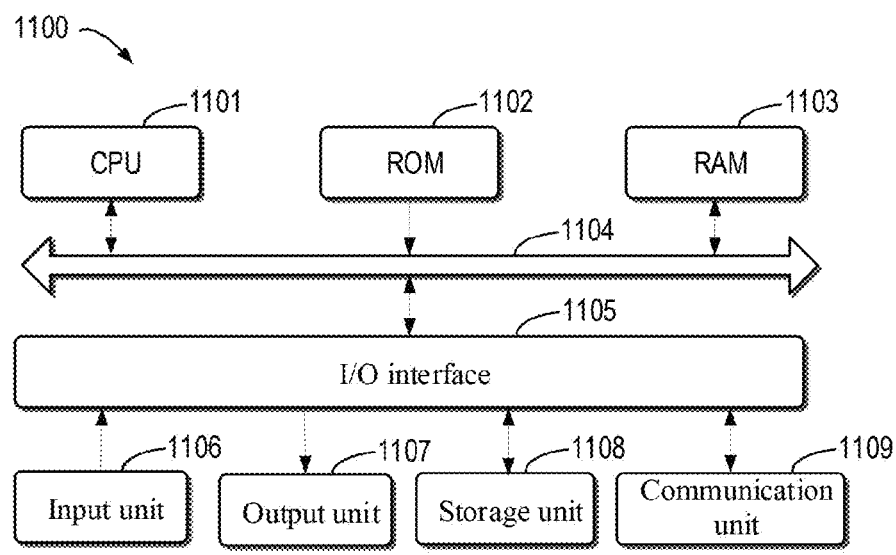
FIG. 11 shows a block diagram of a computing device capable of implementing a plurality of embodiments of the present disclosure.

FIG. 11 shows a schematic block diagram of an exemplary device 1100 capable of implementing various embodiments of the present disclosure. The device 1100 may be used to implement the apparatus 1000 for processing an image of the present disclosure. As shown in the figure, the device 1100 includes a central processing unit (CPU) 1101 that may perform various appropriate actions and processing in accordance with computer program instructions stored in a read only memory (ROM) 1102 or computer program instructions loaded into a random access memory (RAM) 1103 from a storage unit 1108. In the RAM 1103, various programs and data required for the operation of the device 1100 may also be stored. The CPU 1101, the ROM 1102, and the RAM 1103 are connected to each other through a bus 1104. An input/output (I/O) interface 1105 is also coupled to the bus 1104.

A plurality of components in the device 1100 are coupled to the I/O interface 705, including: an input unit 1106, such as a keyboard or a mouse; an output unit 1107, such as various types of displays, or speakers; the storage unit 1108, such as a disk or an optical disk; and a communication unit 1109 such as a network card, a modem, or a wireless communication transceiver. The communication unit 1109 allows the device 1100 to exchange information/data with other devices over a computer network such as the Internet and/or various telecommunication networks.

The processing unit 1101 performs the various methods and processes described above, such as the process 400 and/or the process 900. For example, in some embodiments, the process 400 and/or the process 900 may be implemented as a computer software program that is tangibly embodied in a machine readable medium, such as the storage unit 1108. In some embodiments, some or all of the computer programs may be loaded and/or installed onto the device 1100 via the ROM 1102 and/or the communication unit 1109. When a computer program is loaded into the RAM 1103 and executed by the CPU 1101, one or more of the actions or steps of the process 400 and/or the process 900 described above may be performed. Alternatively, in other embodiments, the CPU 1101 may be configured to perform the process 400 and/or the process 900 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general-purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine-readable medium may be a tangible medium that may contain or store programs for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions are described in a specific order, this should not be understood that such actions are required to be performed in the specific order shown or in sequential order, or all illustrated actions should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for processing an image, the method comprising:
   determining a to-be-processed first region and a to-be-processed second region in an input image, the first region at least partially filled with a first color, the second region at least partially filled with a second color, the first region and the second region being adjacent regions sharing a common boundary region, wherein the determining comprises:
      acquiring a color dictionary, the color dictionary indicating a plurality of valid colors filled in regions in the input image; and
      determining the first region and the second region adjacent to each other, in response to determining that the first color and the second color are included in the plurality of valid colors;
   shrinking the first region and the second region, to enable neither of the shrunken first region and the shrunken second region to include the boundary region; and
   expanding the shrunken first region and the shrunken second region, to enable the boundary region to be filled with at least one color of the first color or the second color,
   wherein the color dictionary further indicates the first color being associated with a first priority level and the second color being associated with a second priority level, and the expanding the shrunken first region and the shrunken second region comprises:
      executing image dilation on the shrunken first region, to add a plurality of pixels having the first color near a first boundary of the shrunken first region;
      executing image dilation on the shrunken second region, to add a plurality of pixels having the second color near a second boundary of the shrunken second region; and
      executing image superposition on the dilated shrunken first region and the dilated shrunken second region obtained after the image dilation based on the first priority level and the second priority level.

2. The method according to claim 1, wherein the shrinking the first region and the second region comprises:
removing the boundary region from the first region and the second region.

3. The method according to claim 1, wherein the shrinking the first region and the second region comprises:
executing image erosion on the first region, to remove a plurality of pixels near a first boundary of the first region in the first region; and
executing image erosion on the second region, to remove a plurality of pixels near a second boundary of the second region in the second region.

4. The method according to claim 1, wherein the executing image superposition on the dilated shrunken first region and the dilated shrunken second region obtained after the image dilation comprises:
enabling the dilated shrunken first region obtained after the image dilation to at least partially cover the dilated shrunken second region obtained after the image dilation, in response to the first priority level being higher than the second priority level.

5. The method according to claim 1, wherein the input image comprises a third region, the third region is filled with a third color excluded in the plurality of valid colors, and the method further comprises:
selecting a fourth color best matching the third color from the plurality of valid colors; and
filling the third region with the fourth color to replace the third color.

6. The method according to claim 5, wherein the selecting the fourth color comprises:
determining respective distances between the third color and the plurality of valid colors, the distances indicating corresponding differences between the third color and the plurality of valid colors; and
selecting a valid color having a smallest distance between the valid color and the third color from the plurality of valid colors as the fourth color.

7. The method according to claim 6, wherein the third color is represented by a first vector, the fourth color is represented by a second vector, and the distance between the third color and the fourth color is a Euclidean distance between the first vector and the second vector.

8. An apparatus for processing an image, comprising:
at least one processor; and
a memory storing instructions, the instructions when executed by the at least one processor, cause the at least one processor to perform operations, the operations comprising:
determining a to-be-processed first region and a to-be-processed second region in an input image, the first region at least partially filled with a first color, the second region at least partially filled with a second color, the first region and the second region being adjacent regions sharing a common boundary region, wherein the determining comprises:
acquiring a color dictionary, the color dictionary indicating a plurality of valid colors filled in regions in the input image; and
determining the first region and the second region adjacent to each other, in response to determining that the first color and the second color are included in the plurality of valid colors;
shrinking the first region and the second region, to enable neither of the shrunken first region and the shrunken second region to include the boundary region; and
expanding the shrunken first region and the shrunken second region, to enable the boundary region to be filled with at least one color of the first color or the second color,
wherein the color dictionary further indicates the first color being associated with a first priority level, and the second color being associated with a second priority level, and the expanding the shrunken first region and the shrunken second region comprises:
executing image dilation on the shrunken first region, to add a plurality of pixels having the first color near a first boundary of the shrunken first region;
executing image dilation on the shrunken second region, to add a plurality of pixels having the second color near a second boundary of the shrunken second region; and
executing image superposition on the dilated shrunken first region and the dilated shrunken second region obtained after the image dilation based on the first priority level and the second priority level.

9. The apparatus according to claim 8, wherein the shrinking the first region and the second region comprises:
removing the boundary region from the first region and the second region.

10. The apparatus according to claim 8, wherein the shrinking the first region and the second region comprises:
executing image erosion on the first region, to remove a plurality of pixels near a first boundary of the first region in the first region; and
executing image erosion on the second region, to remove a plurality of pixels near a second boundary of the second region in the second region.

11. The apparatus according to claim 8, wherein the executing image superposition on the dilated shrunken first region and the dilated shrunken second region obtained after the image dilation comprises:
enabling the dilated shrunken first region obtained after the image dilation to at least partially cover dilated shrunken the second region obtained after the image dilation, in response to the first priority level being higher than the second priority level.

12. The apparatus according to claim 8, wherein the input image comprises a third region, the third region is filled with a third color excluded in the plurality of valid colors, and the operations further comprises:
selecting a fourth color best matching the third color from the plurality of valid colors; and
filling the third region with the fourth color to replace the third color.

13. The apparatus according to claim 12, wherein the selecting the fourth color comprises:
determining respective distances between the third color and the plurality of valid colors, the distances indicating corresponding differences between the third color and the plurality of valid colors; and
selecting a valid color having a smallest distance between the valid color and the third color from the plurality of valid colors as the fourth color.

14. The apparatus according to claim 13, wherein the third color is represented by a first vector, the fourth color is represented by a second vector, and the distance between the third color and the fourth color is a Euclidean distance between the first vector and the second vector.

15. A non-transitory computer readable storage medium storing a computer program, wherein the computer program, when executed by a processor, cause the processor to perform operations, the operations comprising:

determining a to-be-processed first region and a to-be-processed second region in an input image, the first region at least partially filled with a first color, the second region at least partially filled with a second color, the first region and the second region being adjacent regions sharing a common boundary region, wherein the determining comprises:

acquiring a color dictionary, the color dictionary indicating a plurality of valid colors filled in regions in the input image; and determining the first region and the second region adjacent to each other, in response to determining that the first color and the second color are included in the plurality of valid colors;

shrinking the first region and the second region, to enable neither of the shrunken first region and the shrunken second region to include the boundary region; and expanding the shrunken first region and the shrunken second region, to enable the boundary region to be filled with at least one color of the first color or the second color, wherein the color dictionary further indicates the first color being associated with a first priority level and the second color being associated with a second priority level, and the expanding the shrunken first region and the shrunken second region comprises:

executing image dilation on the shrunken first region, to add a plurality of pixels having the first color near a first boundary of the shrunken first region;

executing image dilation on the shrunken second region, to add a plurality of pixels having the second color near a second boundary of the shrunken second region; and executing image superposition on the dilated shrunken first region and the dilated shrunken second region obtained after the image dilation based on the first priority level and the second priority level.

* * * * *